(12) United States Patent
Lescuyer et al.

(10) Patent No.: US 8,363,594 B2
(45) Date of Patent: Jan. 29, 2013

(54) ADDRESS SPOOFING PREVENTION

(75) Inventors: Pierre Lescuyer, Montigny le Bretonneux (FR); Thierry Lucidarme, Montigny le Bretonneux (FR)

(73) Assignee: Apple, Inc., Cupertino, CA (US)

( * ) Notice: Subject to any disclaimer, the term of this patent is extended or adjusted under 35 U.S.C. 154(b) by 1086 days.

(21) Appl. No.: 11/594,404

(22) Filed: Nov. 8, 2006

(65) Prior Publication Data

US 2008/0107065 A1 May 8, 2008

(51) Int. Cl.
*H04W 4/00* (2009.01)

(52) U.S. Cl. .................. 370/328; 726/3; 726/4; 726/11; 726/12; 726/21; 455/41.2; 455/435.1; 455/435.2; 455/552.1; 455/553.1; 455/410

(58) Field of Classification Search .................. 726/3, 4, 726/11, 12, 14, 21, 23; 455/41.2, 435.1, 455/435.2, 552.1, 553.1, 410

See application file for complete search history.

(56) References Cited

U.S. PATENT DOCUMENTS

| | | | |
|---|---|---|---|
| 6,301,609 B1 | 10/2001 | Aravamudan et al. | |
| 6,654,589 B1 | 11/2003 | Haumont | |
| 6,675,016 B2 | 1/2004 | Lucidarme et al. | |
| 7,103,310 B2 | 9/2006 | Lucidarme et al. | |
| 7,103,333 B2 | 9/2006 | Lazaridis et al. | |
| 7,123,910 B2 | 10/2006 | Lucidarme et al. | |
| 7,317,928 B2 | 1/2008 | Stewart et al. | |
| 7,320,070 B2 * | 1/2008 | Baum ........................... | 713/153 |
| 7,324,529 B2 | 1/2008 | Lucidarme et al. | |
| 7,433,675 B2 | 10/2008 | Lucidarme et al. | |

(Continued)

FOREIGN PATENT DOCUMENTS

| | | |
|---|---|---|
| CA | 2172564 | 10/1996 |
| EP | 1416756 | 5/2004 |

(Continued)

OTHER PUBLICATIONS

U.S. PTO "Communication" for copending U.S. Appl. No. 11/331,764 mailed Apr. 2, 2010; available in USPTO Patent Application Information Retrieval database.

(Continued)

*Primary Examiner* — Olumide T Ajibade Akonai
*Assistant Examiner* — Edward Zhang
(74) *Attorney, Agent, or Firm* — Meyertons, Hood, Kivlin, Kowert & Goetzel, P.C.; Eric B. Meyertons

(57) ABSTRACT

The present invention relates to a method for securing a radio communication link establishment in a radio communication network comprising a local network and a secured network. The local network comprises at least a first terminal and a second terminal and at least the first terminal is capable of communicating with the secured network. The radio communication network implements layered protocol functions, comprising at least Layers 1, 2 and 3, the terminals being identifiable by their Layer 2 and 3 addresses. The secured network comprises a database comprising address correspondence information between Layer 2 and 3 addresses of terminals. In the method the first terminal authenticates itself with the secured network and then by using the Layer 3 address of the second terminal, obtaining the address correspondence information provided by the database and thereby determining the corresponding Layer 2 address of the second terminal. Then the first terminal establishes in the local network the radio communication link with the second terminal by using the Layer 2 address.

17 Claims, 2 Drawing Sheets

U.S. PATENT DOCUMENTS

| | | | |
|---|---|---|---|
| 2002/0018442 A1* | 2/2002 | Okada | 370/227 |
| 2002/0035605 A1 | 3/2002 | McDowel et al. | |
| 2002/0049913 A1 | 4/2002 | Lumme | |
| 2002/0083136 A1 | 6/2002 | Whitten | |
| 2002/0131395 A1 | 9/2002 | Wang | |
| 2003/0018726 A1 | 1/2003 | Low et al. | |
| 2003/0023690 A1 | 1/2003 | Lohtia | |
| 2003/0073440 A1 | 4/2003 | Mukherjee et al. | |
| 2003/0217099 A1 | 11/2003 | Bobde et al. | |
| 2004/0078441 A1 | 4/2004 | Malik et al. | |
| 2004/0158609 A1 | 8/2004 | Daniell et al. | |
| 2004/0267887 A1 | 12/2004 | Berger et al. | |
| 2005/0033852 A1 | 2/2005 | Tenhunen | |
| 2005/0055412 A1 | 3/2005 | Kaminsky et al. | |
| 2005/0208926 A1* | 9/2005 | Hamada | 455/410 |
| 2006/0019668 A1* | 1/2006 | Kraiem et al. | 455/446 |
| 2006/0048061 A1 | 3/2006 | Forlenza et al. | |
| 2006/0140173 A1 | 6/2006 | Hoover | |
| 2006/0168087 A1 | 7/2006 | Lescuyer et al. | |
| 2006/0252432 A1 | 11/2006 | Gruchela et al. | |
| 2007/0021097 A1 | 1/2007 | Gaeta et al. | |
| 2007/0030973 A1 | 2/2007 | Mikan | |
| 2007/0047532 A1 | 3/2007 | Bangor et al. | |
| 2007/0135129 A1 | 6/2007 | Lucidarme et al. | |
| 2007/0171910 A1* | 7/2007 | Kumar | 370/392 |
| 2007/0286209 A1* | 12/2007 | Wang et al. | 370/395.54 |
| 2008/0072034 A1 | 3/2008 | Lescuyer et al. | |

FOREIGN PATENT DOCUMENTS

| | | |
|---|---|---|
| EP | 1435749 | 7/2004 |
| WO | 01/20945 | 3/2001 |

OTHER PUBLICATIONS

U.S. PTO "Communication" for copending U.S. Appl. No. 11/331,764 mailed Apr. 24, 2011; available in USPTO Patent Application Information Retrieval database.

U.S. PTO "Communication-PreBrief Appeal Conference Decision" for copending U.S. Appl. No. 11/331,764 mailed Aug. 11, 2010; available in USPTO Patent Application Information Retrieval database.

U.S. PTO "Communication" for copending U.S. Appl. No. 11/331,764 mailed Feb. 2, 2012; available in USPTO Patent Application Information Retrieval database.

U.S. PTO "Communication-PreBrief Appeal Conference Decision" for copending U.S. Appl. No. 11/331,764 mailed Oct. 14, 2012; available in USPTO Patent Application Information Retrieval database.

U.S. PTO "Communication" for copending U.S. Appl. No. 11/331,764 mailed Oct. 27, 2012; available in USPTO Patent Application Information Retrieval database.

U.S. PTO "Communication" for copending U.S. Appl. No. 11/603,300 mailed Aug. 6, 2009; available in USPTO Patent Application Information Retrieval database.

U.S. PTO "Communication" for copending U.S. Appl. No. 11/603,300 mailed Feb. 4, 2010; available in USPTO Patent Application Information Retrieval database.

U.S. PTO "Communication-PreBrief Appeal Conference Decision" for copending U.S. Appl. No. 11/603,300 mailed Jun. 22, 2010; available in USPTO Patent Application Information Retrieval database.

U.S. PTO "Communication" for copending U.S. Appl. No. 11/603,300 mailed Sep. 9, 2010; available in USPTO Patent Application Information Retrieval database.

U.S. PTO "Communication" for copending U.S. Appl. No. 11/603,300 mailed Dec. 22, 2010; available in USPTO Patent Application Information Retrieval database.

U.S. PTO "Communication-PreBrief Appeal Conference Decision" for copending U.S. Appl. No. 11/603,300 mailed Jun. 10, 2011; available in USPTO Patent Application Information Retrieval database.

"3GPPTS 25.413. v3.14.0, 3rd Generation Partnership Project: Technical Specficiaion Group Radio Access Networ; UTRAN Iu interface RANAP signaling (Release 1999)", Sep. 2003, pp. 1-201.

"ETSI TS 125 331 v3.16.0 (Sep. 2003), Universal Mobile Telecommunications System (UMTS); Radio Resource Control (RRC) protocol specification (3GPP TS 25.331 version 3.16.0 Release 1999)", Sep. 2003, pp. 1-876.

"ETSI TS 123 228 v5.14.0 (Sep. 2005), Digital cellular telecommunications system (Phase 2+); Universal Mobile Telecommunications Sytem (UMTS); IP Multimedia Substyem (IMS); Stage 2 (3 gpp TS 23.228 version 5.14.0 Release 5)," Sep. 2005, pp. 1-132.

"ETSI TS 124 228 v5.14.0 (Sep. 2005), Digital cellular telecommunications system (Phase 2+); Universal Mobile Telecommunications Sytem (UMTS); IP Multimedia Substyem (IMS); Stage 2 (3 gpp TS 24.228 version 5.13.0 Release 5)," Jun. 2005, pp. 1-713.

\* cited by examiner

ADDRESS SPOOFING PREVENTION

FIELD OF THE INVENTION

The present invention relates to a method for establishing a secured radio link in a radio communication system. The invention also relates to a corresponding terminal, software program product and database.

BACKGROUND OF THE INVENTION

Security issues are important in radio communication systems. The use of encryption and authentication mechanisms certainly improves the security of radio communication systems, but it is still possible to find vulnerabilities due to the way that networking protocols operate. A definite weakness is the common address resolution protocol (ARP) that Transmission Control Protocol/Internet Protocol (TCP/IP) networks utilize. A hacker with the right tools can exploit ARP and pretend to be somebody else in a radio communication network, such as a wireless local area network (WLAN).

ARP is a crucial function used by a sending wireless or wired network devices to discover the physical address or the Layer 2 address (as referred to as the OSI model) of a destination device. The Layer 2 address of a device is, for instance, the medium access control (MAC) address, which is embedded in the device by the manufacturer and is unique from any other device or network component. The sending device needs to know the Layer 2 address of the destination in order to establish a communication session with the destination, since the sending device only understands and responds to the Layer 2 address.

The application software that needs to send the data will have a Layer 3 address, such as an IP address of the destination, but the sending device has to use ARP to discover the corresponding Layer 2 address. It obtains the Layer 2 address by broadcasting an ARP request packet that announces the Layer 3 address of the destination device.

All devices will hear this request, and the device having the corresponding Layer 3 address will return an ARP response packet containing its Layer 2 and 3 addresses. The sending device will then include this Layer 2 address as the destination address in the frame being sent. The sending device also stores the corresponding Layer 3 address and Layer 2 address mapping in a table for a period of time or until the device receives another ARP response from the station having that Layer 3 address.

A problem with ARP is that it introduces a security risk resulting from ARP spoofing, i.e. the creation of IP packets with a forged (spoofed) source IP address. For instance, a hacker can fool a device by sending from a rogue network device a fictitious ARP response that includes the IP address of a legitimate network device, such as a wireless access point or router, and the MAC address of the rogue device. This causes the legitimate stations in the network to automatically update their ARP tables with the false mapping.

As a consequence, these devices will then send future packets to the rogue device rather than the legitimate access point or router. This is a classic so called man-in-the-middle attack, which enables a hacker to manipulate user sessions. As a result, the hacker can capture sensitive data, obtain passwords and even interface with corporate servers as if they were the legitimate user.

In order to circumvent ARP spoofing, a so called secure ARP (SARP) has been implemented. This enhancement to ARP provides a special secure tunnel between each client and the router or wireless access point, which ignores any ARP responses not associated with the clients on the other end of the secure tunnels. Thus, only legitimate ARP responses provide the basis for updating ARP tables. The devices implementing SARP are free from spoofing.

However, the drawback of the SARP solution is that it still requires the use of ARP and the use of SARP requires the installation of special software on each client. From this reason, SARP is not practical, e.g. for public hotspots. Furthermore, the SARP does not provide means for preventing spoofing of dynamic host configuration protocol (DHCP) and domain name system (DNS) servers.

SUMMARY OF THE INVENTION

One object of the invention is to overcome the above-identified deficiencies. More specifically, a new method for establishing a secure radio communication link avoiding the usage of ARP has been invented.

According to a first aspect of the invention there is proposed a method for securing a radio communication link establishment in a radio communication network comprising a local network and a secured network, at least a first terminal and a second terminal being part of the local network, at least the first terminal being capable of communicating with the secured network, the radio communication network implementing layered protocol functions, comprising at least Layers 1, 2 and 3, the terminals being identifiable by their Layer 2 and 3 addresses, the secured network comprising a database comprising address correspondence information between Layer 2 and 3 addresses of terminals, the method comprises the following steps in respect of the first terminal establishing a radio communication link with the second terminal:

the first terminal authenticating itself with the secured network;
the first terminal, by using the Layer 3 address of the second terminal, obtaining the corresponding Layer 2 address of the second terminal from the address correspondence information comprised in the database; and
establishing in the local network the radio communication link with the second terminal by using the Layer 2 address.

The invention in accordance with an embodiment of the invention has the advantage that address spoofing can be prevented and thus a secure radio communication link can be created between the terminals. Furthermore, the use of ARP can be avoided when implementing the proposed solution.

According to a second aspect of the invention, there is proposed a computer program that is arranged to implement the method in accordance with the first aspect of the invention when loaded and run on computer means of the network.

According to a third aspect of the invention there is proposed a mobile station arranged for establishing a secure radio communication link in a radio communication network comprising a local network and a secured network, at least the mobile station and a terminal being part of the local network, at least the mobile station being capable of communicating with the secured network, the radio communication network implementing layered protocol functions, comprising at least Layers 1, 2 and 3, the mobile station and the terminals being identifiable by their Layer 2 and 3 addresses, the secured network comprising a database comprising address correspondence information between Layer 2 and 3 addresses of terminals, the mobile station comprises:

means for authenticating itself with the secured network;
means for, by using the Layer 3 address of the terminal, obtaining the corresponding Layer 2 address of the terminal from the address correspondence information comprised in the database; and means for establishing in the local network a radio communication link with the terminal by using the Layer 2 address. Other aspects of the invention are recited in the claims appended hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Some embodiments of the invention will next be described with reference to FIGS. 1 and 2.

Figure 1:
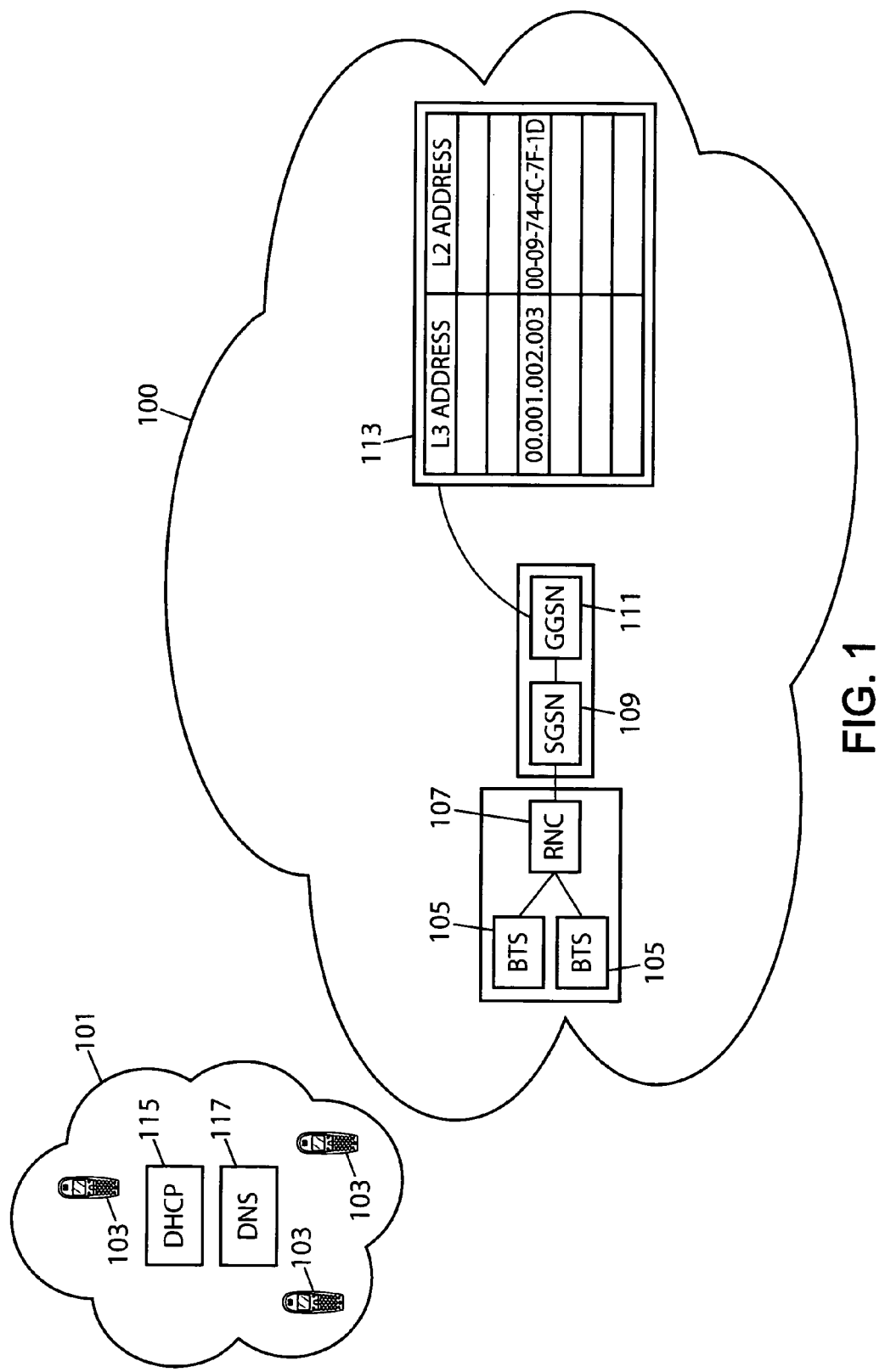
FIG. 1 is a schematic representation of a communication system where the embodiments of the invention can be applied.
Figure 2:
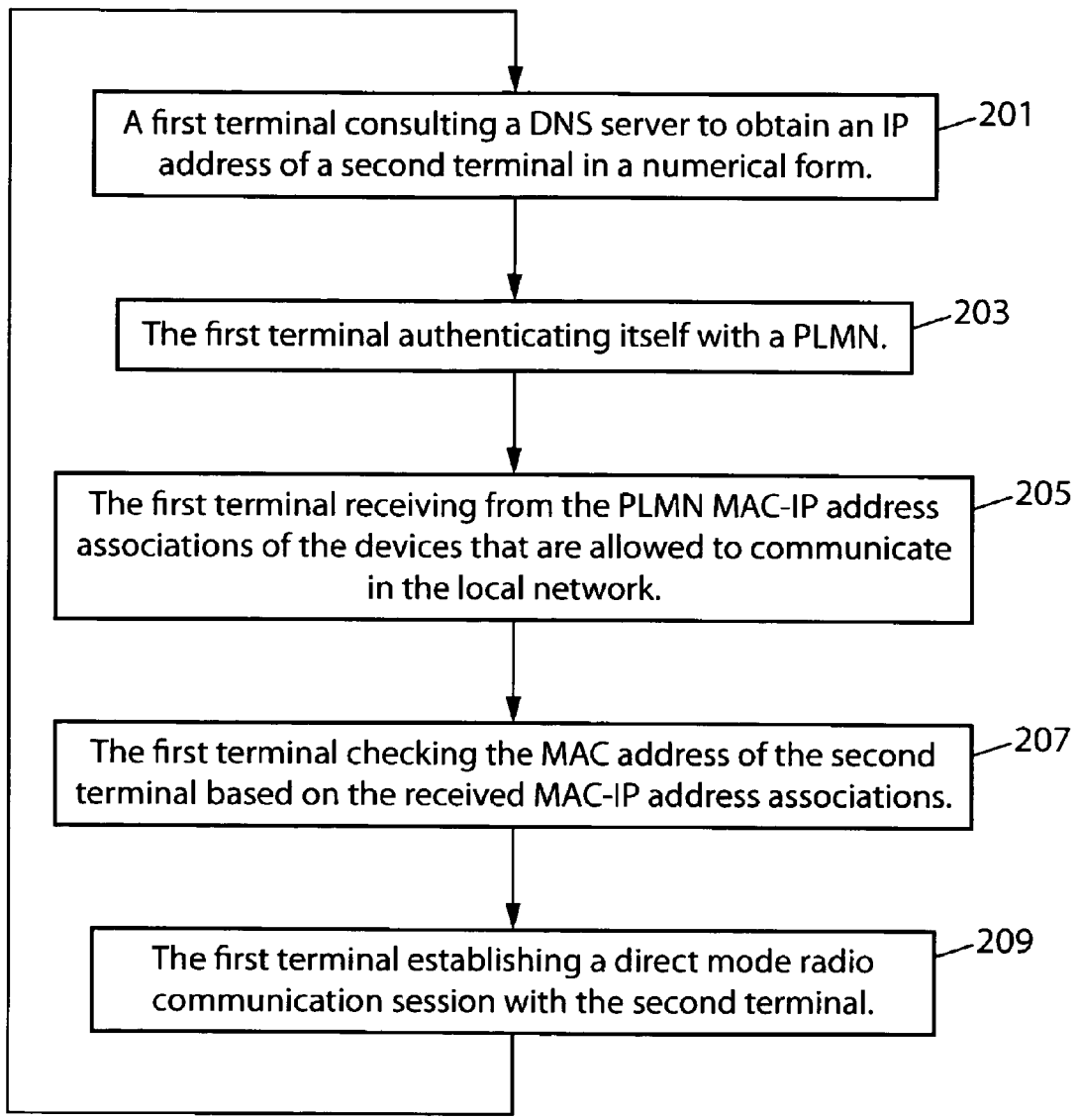
FIG. 2 is a flow chart illustrating a method in accordance with an embodiment of the present invention.

In FIG. 1 there is shown a secured network 100, such as a public land mobile communication network (PLMN) 100, in this example a third generation (3G) universal mobile telecommunication system (UMTS) 100. However, the teachings of the present invention are not limited to this environment, for instance, a secure and trustable private network, such as an Intranet can play the role of the secured network. Other networks are applicable as well, such as Global System for Mobile communications (GSM) or any future networks.

In FIG. 1 there is also shown a local network 101, comprising only a restricted number of user terminals 103 that are allowed to participate in the radio communication with each other either directly in direct mode or indirectly via e.g. a server, a router or an access point. An example of a local network 101 is a terrestrial trunked radio (TETRA) system. However, in TETRA systems the terminal addresses are fixed, but this is not necessarily the case in the present invention as will be explained later. Accordingly, in this example any type of local network is possible as far as the local network 100 is based on layered network protocols defined by open systems interconnection reference model (OSI reference model or OSI model for short) and implements at least the lowest three layers, i.e. Layers 1, 2 and 3.

Layer 1 is the physical layer, Layer 2 is the data link layer and Layer 3 is the network layer. Thus, the teachings of the invention are applicable to any type of ad-hoc local area networking using existing technology, such as ZigBee or future systems. Accordingly, the terminals 103 are arranged to communicate both in the local network 101, but also with the base stations of the UMTS network 100, thus the terminals are so called bi-mode terminals. In the exemplary embodiments of the invention the terminals 103 are arranged to communicate in the local network 101 directly with each other in direct mode.

Furthermore, the terminals are associated with their Layer 2 and Layer 3 addresses. In the following examples the Layer 3 address is an internet protocol (IP) address, whereas the Layer 2 address is a medium access control (MAC) address. However, it is to be noted that that these Layer 2 and 3 addresses could be other addresses than the MAC and IP addresses, respectively. The MAC address is a unique identifier attached to most networking equipments. The IP address is a unique number that network devices use in order to identify and communicate with each other in a network utilizing the IP standard.

In the local network 101 there is also shown a dynamic host configuration protocol (DHCP) server 115 and a domain name system (DNS) server (117). The purpose of the DHCP server 115 is to allocate unique IP addresses to network devices in case of dynamic network addresses. The assignment of the IP address usually expires after a predetermined period of time, at which point the terminals 103 and the DHCP server 115 renegotiate a new address from the server's predefined pool of addresses. It is to be noted that in case of static IP addresses in the network, the DHCP server 115 is no longer needed.

The purpose of the DNS server 117 is to make it possible to attach easy-to-remember domain names or symbolic addresses, such as "google.com" to hard-to-remember IP addresses, such as 10.200.300.400. In case of a large network, several DNS servers 117 may be needed that interact with each other. For simplicity, in FIG. 1, there are only shown one DHCP server 115 and one DNS server 117.

FIG. 1 further shows a part of the architecture of a UMTS network 100. A conventional UMTS network includes a core network (CN) comprising interconnected switches referred to as mobile switching center/visitor location register (MSC/VLR) for circuit-switched services (not shown in the figure) and a serving general packet radio service (GPRS) support node (SGSN) 109 for packet-switched services. In the UMTS terrestrial radio access network (UTRAN) architecture, a number of radio network controllers (RNCs) 107 are connected to the CN switches. Each RNC 107 supervises a number of base transceiver stations (BTSs) 105, or nodes B, through an interface referred to as Iub in the UMTS standards. Certain RNCs 107 may furthermore communicate with one another by means of a so-called Iur interface. The RNCs 107 and the BTSs 105 form an access network called UMTS terrestrial radio access network (UTRAN). The BTSs 105 are distributed over the territory to be covered by the access network. Each BTS 105 serves one or several cells where the cellular service is made available to the public. There is also shown a GPRS gateway support node 111, which is a network node that acts as a gateway between a wireless data network and other networks such as the Internet or private networks.

Furthermore, in FIG. 1 there is shown a server 113 comprising a table, the server 113 being connected to the core network of the UMTS network 100 either directly or indirectly. The server 113 is in this example connected to the GGSN node 111. The server 113 can be seen by the UMTS network 100 as an application server. In accordance with embodiments of the invention the table comprises Layer 3 addresses of legitimate network devices that are allowed to communicate in the local network 101, and the corresponding Layer 2 addresses of those devices. As was stated earlier, in the following examples the Layer 2 address is a MAC address and the Layer 3 address is an IP address. In the following exemplary embodiments the table comprises a proper IP address in a numerical form, but the table could also be arranged to include the IP addresses in a symbolic form. If this is the case, the server 113 would also perform tasks of the DNS server 117 in converting the symbolic IP addresses to proper numerical IP addresses. The address information in the table is kept up-to-date, e.g. by a network operator or by a specific update procedure launched by the terminals 103 having first authenticated themselves with the UMTS network 100.

A first embodiment of the invention will be next described with reference to FIG. 1 and a flow chart of FIG. 2. In the first embodiment the IP addresses of the terminals 103 are static. From this reason, in this embodiment there is no need for the DHCP server 115.

To illustrate the procedure in accordance with this embodiment, it is believed that a first terminal 103 intends to establish a direct mode local radio communication session with a second terminal 103. To this end, the first terminal 103 wants to establish a direct mode radio communication session with the second terminal 103 based on the IP address of the second terminal 103. If the first terminal 103 only knows the symbolic IP address of the second terminal 103, the first terminal first in step 201 needs to consult the DNS server 117 to obtain the proper IP address in a numerical form. However, if the first terminal 103 somehow already knows the proper IP address, then the step 201 is not necessary.

The first terminal 103 also needs to know the MAC address of the second terminal 103 in order to establish the communication session. The first terminal 103 is so located in the local network that it is in the coverage area of the cell defined by the BTS 105 of the UMTS network 100, but in the same time the first terminal 103 is within the range of other network terminals 103.

Then in step 203 the first terminal 103 authenticates itself with the UMTS network 100. Next the first terminal 103 receives in step 205 the table from the server 113. The table contains associations of MAC and IP addresses of legitimate devices that are allowed to communicate in the local network 101.

The table can be transmitted to the terminals 103 in the UMTS network 100 by using for instance a multimedia broadcast multicast service (MBMS) or any other multicast service. The MBMS is a broadcasting service that can be offered via existing GSM and UMTS cellular networks. Furthermore, the table can be transmitted to the terminals 103 within the UMTS network 100 every time when the table is updated. The table can also be transmitted to the first terminal 103 on regular basis or upon request by the first terminal 103. To this end, the table needs to be kept up-to-date so that the table contains MAC-IP address associations of those legitimate terminals 103 that are allowed to communicate in the local network 101. In accordance with the embodiments of the invention, instead of sending the table to terminals 103, it is also possible that the first terminal 103 consults the table from the server 113 or retrieves the table every time when it intends to establish a direct mode radio communication session with another terminal 103 in the local network 101. The embodiments of the invention take the advantage from the fact that the UMTS network or any other PLMN or secured network is relatively save in the sense that unauthorized users do not get access to the data. From this reason, any rogue terminals in the local network 101 do not get access to the table.

After the first terminal 103 has received the MAC-IP address associations in step 205, the first terminal 103 can check, in step 207, from the table the corresponding MAC address of the second terminal 103 based on the IP address of the second terminal 103.

Then the first terminal 103 can establish in step 209 a direct mode radio communication session with the second terminal 103 while knowing that it is communicating with a legitimate device.

In a second embodiment of the invention, the IP addresses are dynamic and for this purpose the DCHP server 115 is needed. Now the DCHP server 115 allocates IP addresses to the terminals 103 that are communicating in the local network 101. In accordance with the second embodiment of the invention, the first terminal 103 ascertains that the DHCP server 115 is legitimate. For this purpose the MAC-IP address association of the DHCP server 115 is saved in the table located in the server 113. The first terminal 103 thereby obtains the IP and MAC addresses of the DHCP server 115 by consulting the table. Thus, the first terminal 103 knows that the DHCP server 115 is legitimate. Now the first terminal 103 can safely request for an IP address. The DHCP server 115 then allocates an IP address to the first terminal 103 and now the first terminal 103 can safely accept the IP address allocated by the DHCP server 115 knowing that the DHCP server 115 is legitimate. This process allows avoiding the use of the classical DHCP discovery phase which is subject to spoofing attack.

The DHCP server 115 advantageously updates the table located in the server 113 every time when it allocates a new IP address to a terminal 103 in the local network 101. This update is done advantageously through a link between the DHCP server 115 and the server 113 which can be secured and mutually authenticated. For similar reason, to avoid the spoofing of IP address corresponding to some given symbolic address, the DNS server 117 also needs to be updated so that the symbolic and numerical IP address associations are correct in the DNS server 117. Since the symbolic IP addresses remain static, the first terminal is able to address the second terminal 103 by using the symbolic IP address of the second terminal. Now the first terminal 103 can establish a direct mode radio communication session with the second terminal after having consulted the table to obtain the corresponding MAC address.

The rest of the procedure goes as described earlier in the context of the first embodiment. When it has been verified that also the second terminal 103 is legitimate, the first terminal 103 can establish a direct mode radio communication session with the second terminal 103.

In one aspect of the invention, the first terminal 103 also ascertains that the DNS server 117 is legitimate. For this purpose the MAC-IP address association of the DNS server 117 is saved in the table located in the server 113. Now the first terminal 103 obtains the MAC and IP addresses of the DNS server 117 by consulting the table. Then the radio communication procedure follows the teachings of the previous embodiments. More specifically, it may or may not be checked whether the DHCP server 115 is legitimate. Of course, if the IP addresses are static, there is no need for the DHCP server 115. Furthermore, this aspect of the invention is not bound to either of the above-identified embodiments.

The invention also relates to a corresponding user terminal 103, in this case a mobile phone handset that is arranged to communicate with the terminals 103 of the local network 101, but equally with the base stations or access points of the secured network 100.

The invention also relates to the corresponding computer program product that is capable of implementing the method in accordance with the embodiments of the invention when loaded and run on computer means of the network.

The invention equally relates to the table that contains the MAC-IP address associations of the terminals 103 that are allowed to communicate in the local network 101.

Above the invention was illustrated and described in detail in the drawings and foregoing description, such illustration and description are to be considered illustrative or exemplary and not restrictive; the invention is not restricted to the disclosed embodiments. For instance, it is possible to operate the invention so that the DHCP and DNS servers 115, 117 are physically located in the secured network 100. In this case the terminals 103 would need to contact these servers through the secured network 100.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims. The mere fact that different features are recited in mutually different dependent claims does not indicate that a combination of these features cannot be advantageously used.

The invention claimed is:

1. A method for establishing a radio communication link in a radio communication network comprising a wireless local network and a secured network, at least a first wireless terminal and a second wireless terminal being part of the wireless local network, at least the first wireless terminal being capable of communicating with the secured network, the radio communication network implementing layered protocol functions comprising at least Layers 1, 2 and 3 functions, the wireless terminals being identifiable by their Layer 2 and 3 addresses, the secured network comprising a database, the database comprising address correspondence information between Layer 2 and 3 addresses of terminals, the method comprising the following steps in respect of the first wireless terminal establishing a radio communication link with the second wireless terminal:
  the first wireless terminal authenticating itself with the secured network;
  the first wireless terminal, by accessing the database and using the Layer 3 address of the second wireless terminal, obtaining the corresponding Layer 2 address of the second terminal from the address correspondence information in the database; and
  establishing in the local network the radio communication link with the second wireless terminal by using the Layer 2 address.

2. The method according to claim 1, wherein the Layer 2 address is the medium access control address of the second wireless terminal and the Layer 3 address is the internet protocol address of the second wireless terminal.

3. The method according to claim 1, wherein the first terminal establishing in the local network radio communication link with the second wireless terminal is a direct mode radio communication session with the second wireless terminal.

4. The method according to claim 1, wherein the first wireless terminal obtains the Layer 2 address of the second wireless terminal from the address correspondence information in the database via a multicast service.

5. The method according to claim 4, wherein the multicast service is a Multimedia Broadcast Multicast Service.

6. The method according to claim 1, wherein the radio communication network further comprises a dynamic host configuration protocol server and/or a domain name system server, the method further comprising the first wireless terminal obtaining the Layer 2 and 3 addresses of the dynamic host configuration protocol server and/or the domain name system server from the address correspondence information in the database.

7. The method according to claim 6, further comprising the dynamic host configuration server updating the address correspondence information in the database after having allocated a Layer 3 address to a wireless terminal in the local network.

8. The method according to claim 1, wherein the address correspondence information is transmitted to the first wireless terminal over a secured radio link of the secured network.

9. A computer program product embodied in a non transitory computer readable storage medium comprising instructions for implementing the method steps according to claim 1 when loaded and run on a computer of the network.

10. A wireless mobile station arranged for establishing a secure radio communication link in a radio communication network comprising a wireless local network and a secured network, at least the wireless mobile station and a wireless terminal being part of the wireless local network, at least the wireless mobile station being capable of communicating with the secured network, the radio communication network implementing layered protocol functions comprising at least Layers 1, 2 and 3 functions, the wireless mobile station and the wireless terminal being identifiable by their Layer 2 and 3 addresses, the secured network comprising a database, the database comprising address correspondence information between Layer 2 and 3 addresses of wireless terminals, the wireless mobile station configured to:
  authenticate the wireless mobile station with the secured network;
  by accessing the database and by using the Layer 3 address of the wireless terminal, obtain the corresponding Layer 2 address of the wireless terminal from the address correspondence information in the database; and
  establish in the wireless local network a radio communication link with the wireless terminal by using the Layer 2 address.

11. The wireless mobile station according to claim 10, wherein the Layer 2 address is a medium access control address of the wireless terminal and the Layer 3 address is an internet protocol address of the wireless terminal.

12. The wireless mobile station according to claim 10, wherein the local network radio communication link is established with the wireless terminal as a direct mode radio communication session with the wireless terminal.

13. The wireless mobile station according to claim 10, wherein the wireless mobile station obtains the Layer 2 address of the wireless terminal from the address correspondence information in the database via a multicast service.

14. The wireless mobile station according to claim 10, wherein the wireless mobile station obtains the Layer 2 address of the wireless terminal from the address correspondence information in the database via a Multimedia Broadcast Multicast Service.

15. The wireless mobile station according to claim 10, wherein the radio communication network further comprises a dynamic host configuration protocol server and/or a domain name system server, and wherein the wireless mobile station obtains the Layer 2 and 3 addresses of the dynamic host configuration protocol server and/or the domain name system server from the address correspondence information in the database.

16. The wireless mobile station according to claim 10, wherein the radio communication network further comprises a dynamic host configuration protocol server and/or a domain name system server, wherein the wireless mobile station obtains the Layer 2 and 3 addresses of the dynamic host configuration protocol server and/or the domain name system server from the address correspondence information in the database, and wherein the dynamic host configuration server is configure to update the address correspondence information in the database after having allocated a Layer 3 address to a wireless terminal in the local network.

17. The wireless mobile station according to claim 10, wherein the address correspondence information is communicated to the mobile wireless station over a secured radio link of the secured network.

* * * * *